United States Patent [19]

Dempsey et al.

[11] Patent Number: 4,926,053

[45] Date of Patent: May 15, 1990

[54] RADON MONITOR

[75] Inventors: John C. Dempsey, Salamanca, N.Y.; Lorin R. Stieff, Kensington, Md.

[73] Assignee: Rad Elec., Inc., Washington, D.C.

[21] Appl. No.: 289,438

[22] Filed: Dec. 23, 1988

Related U.S. Application Data

[63] Continuation of Ser. No. 529,772, Aug. 31, 1983, abandoned.

[51] Int. Cl.$^5$ .............................................. G01T 1/00
[52] U.S. Cl. .................................... 250/376; 250/253; 250/472.1
[58] Field of Search ............... 250/253, 283, 376, 378, 250/395, 472.1, 473.1, 489

[56] References Cited

U.S. PATENT DOCUMENTS

| | | | |
|---|---|---|---|
| 2,695,363 | 11/1954 | Marvin | 250/375 |
| 4,064,436 | 12/1977 | Ward, III | 250/253 |
| 4,338,523 | 7/1982 | Alter | 250/472.1 |
| 4,385,236 | 5/1983 | Hassib et al. | 250/472.1 |
| 4,401,891 | 8/1983 | Lewiner et al. | 250/374 |
| 4,451,736 | 5/1984 | Cameron | 250/376 |
| 4,518,860 | 5/1985 | Alter et al. | 250/253 |

FOREIGN PATENT DOCUMENTS 237721 7/1986 German Democratic Rep. .

OTHER PUBLICATIONS

P. C. Gupta, P. Kotrappa and S. K. Dua, "Electret Personnel Dosimeter" *Radiation Protection Dosimetry*, vol. 11, No. 2, (1985) pp. 107–112.

P. Kotrappa, S. K. Dua., P. C. Gupta, N. S. Pimpale and A. H. Khan, "Measurement of Potential Alpha Energy Concentration of Radon and Thoron Daughters Using an Electret Dosemeter" *Radiation Protection Dosimetry*, vol. 5, No. 1 (1983) pp. 49–56.

Kotrappa, P., et al.; "Electret-A New Tool For Measuring Concentrations of Radon and Thoron in Air", *Health Physics*, vol. 41, Jul. pp. 35–46, (1981).

Kotrappa, P., et al., "Passive Measurement of Radon and Thoron Using TLD or SSNTD on Electrets", *Health Physics*, vol. 41, Sep., pp. 399–404, (1982).

Gupta, P. C., et al., "Large Volume Electret Dosemeter for Measurement of Low Level Radiation", *Radiation Protection Dosimetry*, vol. 4, pp. 51–55, (1983).

Kotrappa, P., et al., "X and Gamma Dose Measurement Using Electrets", *Radiation Protection Dosimetry*, vol. 2, No. 3, pp. 175–181, (undated but accepted 1982).

Costa-Ribeiro, C., et al., "A Radon Detector Suitable for Personnel or Area Monitoring", *Health Physics*, vol. 17, pp. 193–198,(1969).

*Primary Examiner*—Constantine Hannaher
*Attorney, Agent, or Firm*—Cushman, Darby & Cushman

[57] ABSTRACT

A sensitive radon monitor has a container with a flat bottom and an upwardly and outwardly extending truncated conical side wall terminating upwardly in a relatively large upper edge. A cover overlies the upper edge. The cover has a disk-shaped plate with holes in a circular arrangement. A filter is placed atop the disk and a retainer ring overlies a peripheral portion of the filter and the disk. A negatively charged electret is held against an underside of a central position on the disk, and a detector is held upward against the electret. A second positively charged electret lines the inside of the cup-shaped base. Ambient gases flow into and out of the container through the filter and through the holes in the cover disk. The filter removes liquid and solid particles flowing through the opening establish an equilibrium. Radon decays within the chamber and positively charged products of the decay are attracted and repelled toward the first electret and toward the detector. The positively charged particles are held on the detector while they decay. Later, the detector is removed and is studied for evidence of decay of charged particles repelled toward, attracted to and held on the detector by the electret combination. The container is portable and can be used as a badge for miners or as a radon detecting device in buildings.

13 Claims, 1 Drawing Sheet

RADON MONITOR

This is a continuation of application Ser. No. 06/529,772, filed August 31, 1983, which was abandoned upon the filing of the continuation.

BACKGROUND OF THE INVENTION

There is a growing need for a small, accurate, sensitive, low cost device for monitoring the amount of radioactive radon daughter products (radon) in air.

Such a monitoring device is needed for uranium miners in order to assure that the concentration of radon and its daughter products in the mine air they breathe is in compliance with Federal exposure limit regulations. There is also a growing need for a similar but more sensitive device which can monitor these radioisotopes in poorly ventilated buildings to protect the health of the inhabitants. Such devices are also needed to measure the radon in soil since higher concentrations indicate the presence of uranium ore buried deeply beneath the surface.

Radon is a gaseous decay product in the uranium decay series which decays by alpha emission with a half-life of 3.5 days. When it is formed near the surface of uranium containing materials such as soil or rocks, it diffuses out into the surrounding air where it can pose a radiological hazard under certain circumstances. Some of the daughter products of radon, which form and decay in sequence soon after the radon decays, are potentially more hazardous to man than their radon parent because of their more energetic emissions. By measuring these radon daughter products with the present invention over a known time period one can readily calculate their concentration in air and that of their radon parent as well.

Several instruments are commercially available for measuring radon and/or its daughter isotopes but they are large and costly and generally unsuited for use in the applications cited above.

A radon measuring device was described by Cost-Ribeiro, et al., in 1969 ("A Radon Detector Suitable for Personnel or Area Monitoring", *Health Physics*, Vol. 17, pp 193-198) which utilizes the well-known passive diffusion (PD) chamber principle for sample collection and an electrostatic field to attract the charged radon daughters to a detector. However, that earlier device, which is now commercially available, utilizes a large high voltage battery pack to supply the high voltage needed to electrostatically transport and collect the charged atoms toward and on the detector surface. As a result, this device is inherently bulky, heavy and expensive and, accordingly, is not at all practical for use in applications to which the present invention is directed. Moreover, the earlier instrument utilizes an electronic detector to measure the radon daughter radiation in real-time. An improved version of this device is now available which also uses an integrating detector. However, it still uses the bulky battery pack. Still another version now available employs the PD chamber principle and the small alpha track detector (not a TLD detector).

SUMMARY OF THE INVENTION

The invention consists of a small rugged device having no moving parts which, with minor variations, serves all of the applications cited. It can measure the average radon daughter concentrations over a period of time (e.g., days or weeks) and it is about 1000 times more sensitive than comparable devices available heretofore.

The present invention comprises (1) a passive diffusion (PD) chamber into which radon gas can readily enter by diffusion through a porous material, (2) positive and negative electret materials arranged on the interior PD chamber surfaces so as to generate a well focused electrostatic field, and (3) a radiation detector. Either a dielectric track detector (TLD) or a thermoluminescent detector such as lithium fluoride which records the amount of radiation it receives from the decay of the radon daughter atoms can be used. In practice the PD chamber containing the detector is hermetically sealed prior to use to prevent radon entry. It is unsealed when used and placed in the area where the radon daughter measurement is desired. After use it is resealed and returned to the laboratory where the cumulative amount of radiation exposure recorded in the detector is measured. From these data, the average concentration of radon daughters and radon which existed during the test can be calculated.

The present invention measures two or four daughter products (depending on the type of detector used) in the well known sequence of radioactive decay events which uranium undergoes in nature. This sequence is known as the uranium decay chain. When an atom of radon-222 (Rn-222) gas decays by alpha emission, it becomes an atom of polonium-218 (Po-218) which, for a short time, is highly positively charged. Po-218 decays by alpha emission with a half life of 3.05 minutes to become, in turn, lead-214 and bismuth-214 with half-lives of 26.8 and 19.7 minutes, respectively. Both of these daughter products decay in sequence by beta emission and the latter (i.e., bismuth-214) becomes polonium-214, which is also positively charged temporarily and which also decays by alpha emission with a half life of less than one second. In nature all of these daughter products are usually found in secular equilibrium with their parent Rn-222 such that a measure of any one of them in an air or soil sample can be used to calculate the amount of any of the others, including Rn-222, present with it in the sample.

As a result of the radioactive decay process it is known that the nucleus of the resulting daughter product is left in an excited state and the atom is ionized. Although it is believed that the nuclear instabilities, at least, are relatively short lived, it is known that the consequences of the decay process are sufficiently long lasting to permit collection and concentration of the Rn-222 products with electrostatic fields.

In the present invention, the interior walls of the PD chamber are specially shaped and lined with a positively and negatively charged electret material such that they repel the charged atoms and direct them to the detector surface which is negatively charged. Many materials have been found to retain an electrostatic charge for some time after exposure to a high voltage electric field. Such an electrostatically charged piece of material is an electret. FEP and TED Teflon, for example, have been found to accept and maintain a high voltage charge for many years with very little loss of charge quantity. In the present invention, a negatively charged teflon electret is placed immediately under the radiation detection material. The resulting negative electrostatic field penetrates through the detector into the PD chamber to attract the positively charged Po-218 and Po-214 atoms to the detector surface and hold them there until they decay and transmit their radiation to the detector. To enhance the sensitivity of the device still more, the inner surface of the PD chamber opposite the detector is lined with a positively charged electret material which repels the positively charged atoms and condensation nuclei thereby aiding their transport to the detector surface. The radon daughters thus decay directly on the detector surface and as a result can be detected with high efficiency.

The present invention employs a small, low cost integrating type detector which integrates this radiation over any time period of choice. The present invention is about 1000 times more sensitive than the comparable devices available heretofore because it utilizes electrets to collect the charged atom for increased efficiency. Several different types of radiation recording materials are suitable for use as the detector in the invention. These include etchable alpha track films such as cellulose nitrate or crystals of thermoluminescent radiation detection material. Commercially available, lithium fluoride thermoluminescent detectors are used in the preferred embodiment because (1) their stored radiation data are easy to measure using commercially available equipment and (2) they record the alpha, beta and gamma radiation from all four radon daughter products (the alpha track films only detect the alpha radiation from two of the daughters).

DETAILED DECRIPTION OF THE DRAWINGS

Figure 1:
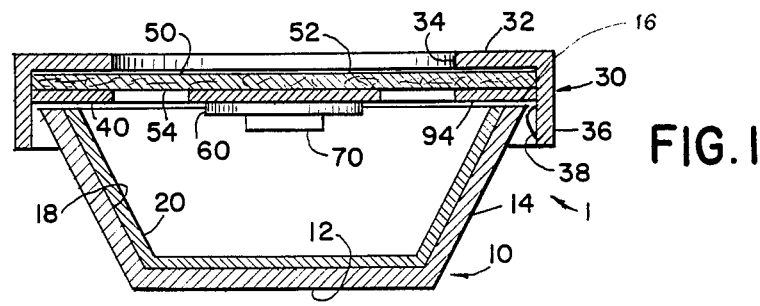
FIG. 1 is a sectional elevation of a sensitive radon monitor constructed according to the present invention.

The sensitive radon monitor is generally referred to by the numeral 1. The monitor includes a container 1 with a cup 10 and a cover 30.

Cup 10 has a circular disk-shaped bottom 12. A truncated conical side wall 14 extends upward and outward from the periphery of the disk-shaped bottom 12 and terminates upwardly in a large, open, upper edge 16.

An inside 18 of the cup is uniformly covered with electret 20 which carries a positive charge.

Cover 30 has a retaining ring 32 which inwardly terminates in a large opening 34. Side walls 36 of the retaining ring 32 extend downward and tightly engage the filter and the cover disk. Plural, inwardly extending, sloped tabs 38 engage an outer peripheral portion of the side wall 14 of cup 10 to hold the upper edge 16 of container 10 tightly against the disk 40 by a snap fit. Tabs 38 tightly clamp the upper end 16 of the side wall 14 against the underside of disk 40. Disk 40 may be a rigid, porous member or may be constructed as a rigid disk having holes 48 arranged in a circular array. A circular outer side wall 46 fits tightly within vertical wall 36 of the retainer ring 32.

A filter 50 has an upper wall 52 with a peripheral portion which underlies the inward extending portion of retainer ring 32. A lower surface 54 of the filter 50 closely overlies the disk 40. Filter 50 removes particles from the ambient gas that passes in and out through the openings 48 in the disk 40. Disk 40 and filter 50 may be replaced with a unitary, porous, rigid assembly or filter 50 may be provided in the form of small filters closely overlying or fitting within the openings 48.

In a preferred embodiment, outer extremities of the openings 48 in the disk 40 are positioned within the opening 34 in the retainer ring 32.

As shown in the drawings, an electret 60 is mounted on the underside of disk 42 and is spaced inward from holes 48 which extend through the disk and which provide the openings into the container. Electret 60 is permanently negatively charged. An upper surface 62 is connected to the lower surface 42 of the disk 40 by chemical, physical or mechanical connection, preferably by bonding but alternatively by welding or mechanically interfitting a surface configuration of electret 60 with a complementary surface configuration on a lower side of disk 40.

Lower surface 64 receives a detector as will be described. The outer edge 66 of electret 60 is preferably spaced inward from the openings 48 in disk 40.

Detector 70 has an upper surface 72 which is connected to the lower surface 64 of the electret 60, either by bonding or welding or by electrostatic attraction.

Due to the direct contact of the upper surface 72 of the detector and the lower surface 64 of the electret, the detector is negatively charged at its exposed lower surface 74 and its edge surfaces 76 to attract any positive substances in the gas or generated by decay of gases, such as by the decay of radon.

Figure 2:
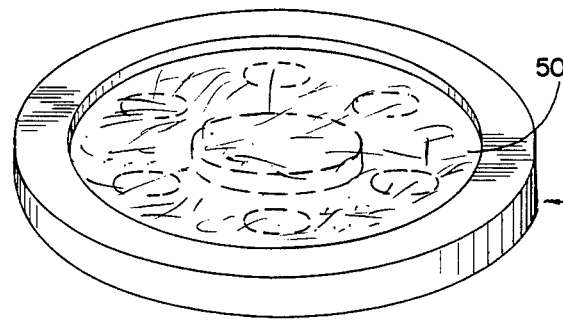
FIG. 2 is a perspective view of the cover of the container shown in FIG. 1.
Figure 3:
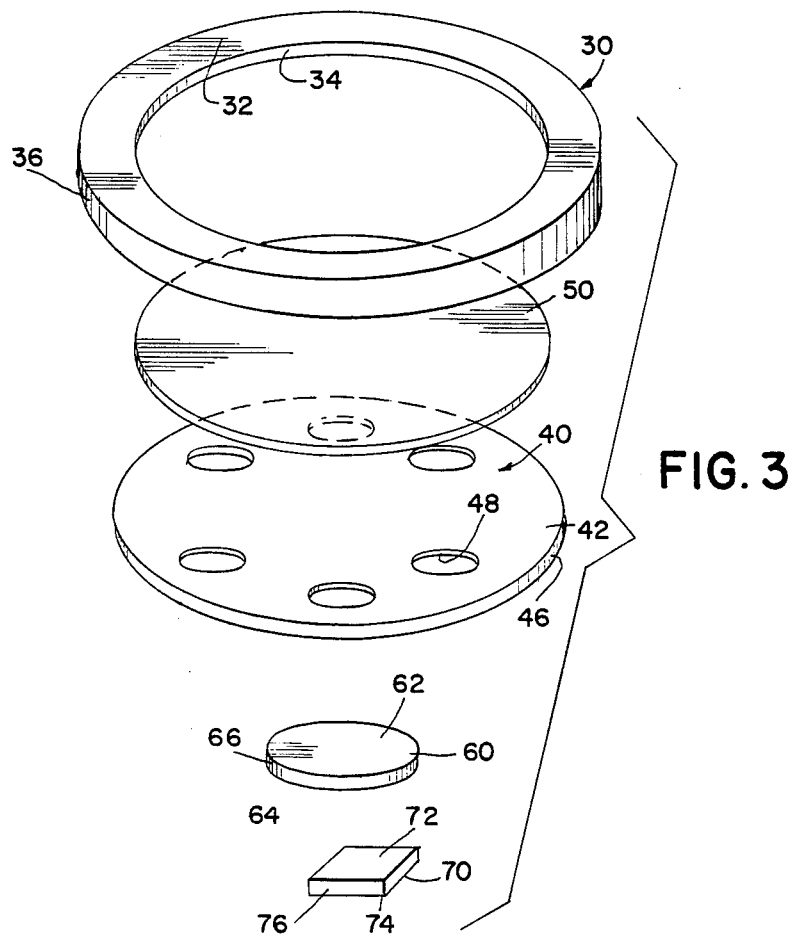
FIG. 3 is an exploded view of elements of the cover shown in FIGS. 1 and 2.

FIG. 1 shows a sectional view of the radon monitor 1. The basic components are the cup-cake shaped passive diffusion (PD chamber cup 10; a porous, removeable cover assembly 30 which supports the integrating radiation detector 70; and positive and negative electrets (20 and 60, respectively) on the inner PD chamber surfaces. The cover assembly 30 contains a porous filtration material layer 54 sandwiched between the retainer ring 32 and the porous strength member which is disc 40. Holes 48 through the disc 40 permit radon to diffuse through the filter 50 and into the PD chamber continuously while excluding all outside dust and charged radon daughter atoms. As seen in FIG. 1, the detector 70 is underlain by a negatively charged electret 60 which causes the detector to take on a like charge on its surface. Thus the detector surface attracts any positively charged atoms (i.e., the radon daughter atoms) for efficient detecton. The chamber cup 10 can be made of metal or plastic. The lid components 32 and 40 can be made of any rigid plastic such as PVC. FIG. 2 shows a top view of the same configuration. The filter 50 is seen to be held in place between the retainer ring 32 and the porous strength member 40 by a friction fit. FIG. 3 is an exploded view of the lid and detector assembly. The electret 60 and detector 70 are affixed mechanically to each other and to the inner lid strength member 40. Thus the source assembly 70 and 60 is readily accessible when the lid is removed.

We claim:
1. Radon monitor apparatus comprising a container having a cup and a cover, openings in the container for allowing gases to enter the container, first electret means positioned within the container for holding an electrostatic charge and detector means associated with the electret means for receiving and holding charged substances from gas entering the container, a second electret means positioned within the container spaced from the first electret means, the second electret means having an electrostatic charge which is opposite to an electrostatic charge of the first electret means for repelling charged substances in the gas by the second electret means toward the first electret means.

2. The apparatus of claim 1 wherein the first electret means is charged negatively and wherein the second electret means is charged positively for driving negatively charged substances in the gas toward the first electret means and the detector means associated therewith.

3. The apparatus of claim 2 wherein the first electret means is mounted on an inner surface of the container and wherein the detector means is mounted inwardly on the first electret means.

4. The apparatus of claim 3 wherein the second electret means is mounted on an inner surface of the container spaced from the first electret means.

5. The apparatus of claim 3 wherein the second electret means is mounted on substantially all inner walls of the container.

6. The apparatus of claim 5 wherein the second electret means is mounted on the entire inner surface of the container and wherein the first electret means is mounted on one portion of the second electret means, the detector means being mounted inwardly in the container on the first electret means.

7. The apparatus of claim 6 further comprising filter means mounted on the container and covering the openings extending through the container for filtering liquid and solids from gases entering the container through the openings.

8. The apparatus of claim 7 wherein the second electret means covers the inside surfaces of bottom and side walls of the cup.

9. The apparatus of claim 1 wherein the cup comprises a generally circular bottom and a truncated conical wall extending upward therefrom to a relatively large circular edge and wherein the cover overlies the circular edge and wherein the first electret means and the detector means are mounted on an inside of the cover.

10. The apparatus of claim 8 wherein the cover comprises a disk for overlying the upper edge of the side wall of the cup, the disk having a plurality of holes extending therethrough and forming the said openings for permitting flow of gas into and out of the container and the disk having a central portion between the holes for holding the first electret means on the inside of the disk facing the bottom of the cup, with the detector means being mounted on the first electret means on a surface thereof facing the bottom of the cup, and wherein the cover means further comprises a filter positioned on top of the lid disk and covering the holes and a retainer ring overlying a peripheral portion of the filter and extending downward around an outer edge of the filter and an outer edge of the lid disk for holding the filter on the lid disk and for holding the lid disk on the upper edge of the wall of the cup.

11. The method of monitoring radon comprising flowing gases including radon through a filter and through an opening into a passive detection container and attracting charged particles from decay of the radon within the container toward a negatively charged first electret mounted within the container and toward a detector associated with the first electret having a like charge with the first electret and holding the charged particles on the first electret during decay of the charged particles, and repelling the charged particles toward the detector by a second electret mounted within the container in a position spaced from the first electret and from the detector, the second electret having a charge similar to a charge on the particles attracted to the detector.

12. The method of claim 11 wherein the flowing of the gas through a filter and openings into the container further comprises flowing gas into and out of the container through the openings and wherein the attracting and repelling comprise attracting charged radon decay products upward toward the first electret and the detector and wherein the repelling comprises repelling charged particles inward and upward toward the detector and the first electret from the second electret which covers a bottom of the container and which covers a truncated conical side wall sloping upward and outward from a bottom of the container.

13. The method of claim 12 further comprising removing a cover from the container, removing the detector from the first electret, sensing the effect of decay on the detector, returning a fresh detector to the first electret and placing the cover back on the container.

* * * * *